Dec. 7, 1948.  W. S. LINDSAY  2,455,591
INSULATION CUTTING TOOL
Filed Dec. 4, 1944

INVENTOR.
William S. Lindsay.
BY

Patented Dec. 7, 1948

2,455,591

UNITED STATES PATENT OFFICE 2,455,591

INSULATION CUTTING TOOL

William S. Lindsay, Harriman, Tenn., assignor, by mesne assignments, to the United States of America as represented by the United States Atomic Energy Commission Application December 4, 1944, Serial No. 566,584

2 Claims. (Cl. 30—95)

This invention relates to devices for cutting the insulation on insulated cables for purposes of stripping or removing the insulation from the cable. Electrical cables may have only a single layer of insulation or there may be two or more layers of insulation with a layer of metal between the layers of insulation, that is, there may be an electrically conductive sleeve or covering around the first layer of insulation which forms a conductor for electrical current at a different voltage. It may be desired to strip the cable all of the way down to the core or it may be desired only to strip it down to a certain depth and in either case it is desired that the cable itself or the metallic sheath or sleeve be not damaged by the instrumentalities used for stripping.

An object of my invention is to provide a tool for making a cut in cable insulation preliminary to stripping characterized by extreme simplicity in design, fabrication, and in use.

Another object of the invention is to provide a tool for making circumferential cuts in cable insulation consisting of a cylindrical element of a size to fit snugly over the cable and having a knife edge associated therewith so arranged that as the member is rotated on the cable a circumferential cut in the insulation of any desired depth can be made.

Another object of the invention is to provide a device as set forth in the preceding object in combination with a clamping member adapted to be clamped to the cable so as to serve as a guide for the rotational movement of the cutting tool as it is rotated for making the cut in the insulation.

Further objects of my invention and numerous of its advantages will become apparent from the following detailed description and annexed drawing wherein Fig. 1 is a plan view of the cutting tool of my invention showing it in place on the cable with the clamping ring or guide also in place on the cable.

Figure 1:
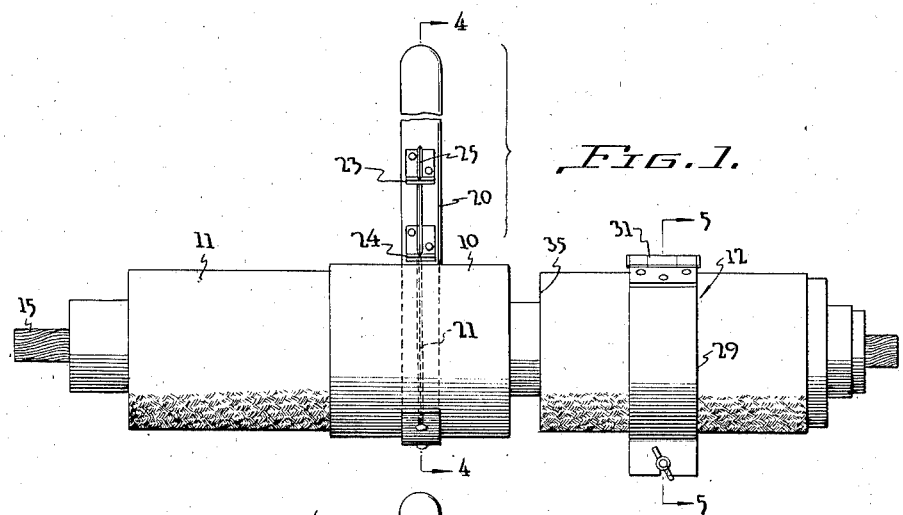
Figure 2:
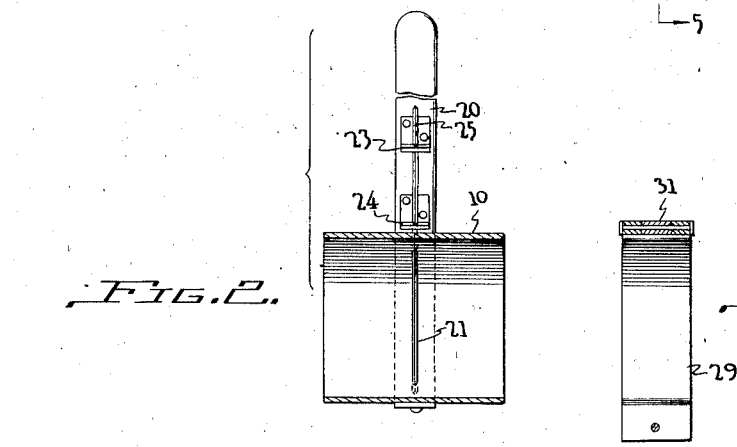
Fig. 2 is a view partially in section of the cutting tool of Fig. 1.
Figure 3:
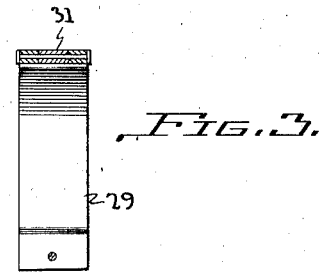
Fig. 3 is a view of the clamping device.

Referring to the figures, numeral 10 designates the main element of the device and it consists simply of a length of cylinder of a size such that it will snugly fit over an insulated cable from which it is desired to strip the insulation. The cylinder member 10 may be several inches long in the direction of its axis so as to provide a considerable bearing surface between the inside of the member 10 and the exterior surface of the cable insulation. The cutting tool is shown in place on the cable in Fig. 1, the cable being designated by the numeral 11 and the cable also being shown in Fig. 4 and in Fig. 5 with the guide ring or member 12 of my invention clamped around the cable. The cable is shown as comprising a central conductor or core 15 having a first layer of insulation 16 thereon and a second layer of insulation 17 with a metallic covering or sleeve 18 around the first layer of insulation, that is, interposed between the two layers of insulation. Surrounding the second layer of insulation 17 is a sleeve or sheath made of interlaced or interwoven copper braid material which in practice is used as a grounded sheath, that is, it distributes any static charge that there may be on the outside of the cable and the sheath is connected to ground for carrying off this charge. It is to be understood, of course, that the device of my invention can be used for stripping insulation from cables of other types than the one just described.

Figure 4:
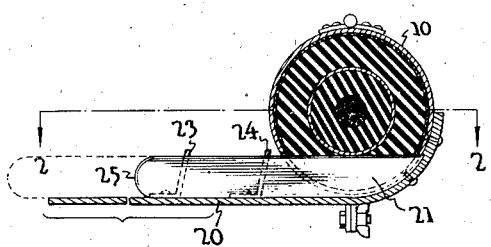
Fig. 4 is a sectional end view of the cutting tool of Figs. 1 and 2.

The cylindrical member 10 has attached thereto a handle 20 by means of rivets as shown, the handle 20 extending tangentially from the cylindrical member 10. Numeral 21 indicates a slot in the side wall of the member 10 which is aligned with the handle 20. Upstanding from the handle 20 are a pair of brackets 23 and 24 which are riveted to the handle and which have slots in them aligned with each other and with the slot 21. Numeral 25 indicates a knife or a member having a knife edge which extends through the slots in the brackets 23 and 24 and into the slot 21 as may be seen on Fig. 4. The knife edge lies in a plane perpendicular to the longitudinal axis of the cylindrical member 10, the inner end of the knife edge member 25 being rounded off as shown in Fig. 4 to conform to the curvature of the member 10.

In operation the member 10 is slipped on the cable to the point where it is desired to make a cut in the insulation for stripping it off, with the knife edge member 25 retracted, that is, withdrawn from the slot 21. The knife member 25 is then inserted into the slot 21, cutting into the insulation as it does so to an extent depending upon the depth of circumferential cut desired in the insulation. After the knife member 25 has been inserted, the handle 20 is grasped with the operator grasping the knife edge member 25 at the same time as he grasps the handle 20 to hold the knife edge member in position and the member 10 is then rotated through one complete revolution. This makes a uniform circumferential cut in the insulation of a depth depending upon the extent to which the knife edge member 25 was inserted. After the cut has been made the knife edge member 25 can, of course, be easily retracted and the member 10 can be slipped along the cable away from the cut and the insulation can then be easily stripped off down to the depth of the cut. If the cut is not quite deep enough the tool can quickly be slipped back into position and the knife edge member 25 again inserted and another cut made similarly so as to cut into the insulation to the desired extent and this can easily be done in the manner described without damaging the underlying metal sleeve 18 or the core 15. The operation is extremely easy to perform and it requires practically no skill on the part of the operator.

Figure 5:
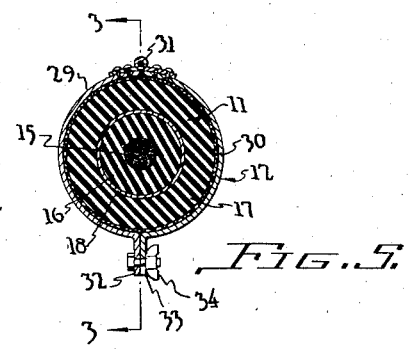
Fig. 5 is a detailed view of the clamping ring or guide member in place on the cable.

In order to positively insure that the member 10 does not slip or slide longitudinally along the cable during the operation, and to relieve the operator of having to hold it against such sliding or slipping, I provide a guiding device 12 which consists of a clamp comprising of two half round elements 29 and 30 as shown on Fig. 5 which are hinged together by means of a hinge 31 and which have matching flanges 32 and 33 which can be securely clamped together by a wing nut 34. The device 12 is of such size that when it is clamped on the cable and the wing nut 34 tightened up the device is held securely in position on the cable. The cutting tool is then slid along the cable until its edge bears against the guide ring or member 12 and as the cutting tool is rotated it is accurately guided in its rotational movement by the member 12. The member 12 is, of course, clamped on the cable at a point adjacent where it is desired that the cut be made in the insulation.

Fig. 1 shows the cutting tool 10 just after a cut has been made in the cable as shown at 35, the cutting tool having been slid to the left after making the cut. The outer layer of insulation is shown as having been slid or worked slightly to the left.

From the foregoing those skilled in the art will observe that I have provided an extremely simple device for making circumferential cuts in cable insulation and one which requires practically no skill to use and yet which is efficient and positive in its results. By means of the tool and the guide device 12, cylindrical cuts can be made to any desired depth and at any point along the cable either for stripping off insulation at the end of a cable or between two spaced points along the cable.

The foregoing disclosure is representative of a preferred form of my invention and it is intended that the disclosure be interpreted in an illustrative rather than a limiting sense and that the scope of the invention be determined only in accordance with the claims appended hereto.

I claim:

1. A cable insulation cutting device of the character described comprising an elongated cylindrical sleeve for disposition about the insulation of a cable, a slot extending transversely across the body of said sleeve, a handle mounted on said sleeve adjacent one end for pivotal movement about said mounting, and a cutter on said handle for movement into said slot radially of the sleeve for cutting the insulation of the cable as the sleeve is rotated thereon.

2. A cable insulation cutting device of the character described comprising an elongated cylindrical sleeve for disposition about the insulation of a cable, a slot extending transversely across the body of said sleeve, a handle mounted on said sleeve adjacent one end for pivotal movement about said mounting, a cutter on said handle for movement into said slot radially of the sleeve for cutting the insulation of the cable as the sleeve is rotated thereon, and a split expansible guide for clamping engagement with the cable to provide a continuous circumferential guiding surface for limiting axial movement of the sleeve.

WILLIAM S. LINDSAY.

REFERENCES CITED

The following references are of record in the file of this patent:

UNITED STATES PATENTS

| Number | Name | Date |
| --- | --- | --- |
| 18,918 | Lloyd | Dec. 22, 1857 |
| 81,402 | Peace | Aug. 25, 1868 |
| 1,279,022 | Scott | Sept. 17, 1918 |
| 2,317,944 | Schaefer | Apr. 27, 1943 |